United States Patent
Wiese et al.

(10) Patent No.: US 7,429,420 B2
(45) Date of Patent: Sep. 30, 2008

(54) METHOD FOR PRODUCING FOAMED POLYMER MOLDED BODIES AND SAID FOAMED POLYMER MOLDER BODIES

(75) Inventors: Frank Wiese, Wuppertal (DE); Hartmut Stenzel, Obernburg (DE); Quan Huang, Obernburg (DE); Bernd Seibig, Geesthacht (DE); Dieter Paul, Kleinmachnow (DE)

(73) Assignee: Membrana GmbH, Wuppertal (DE)

( * ) Notice: Subject to any disclaimer, the term of this patent is extended or adjusted under 35 U.S.C. 154(b) by 376 days.

(21) Appl. No.: 10/513,402

(22) PCT Filed: Apr. 30, 2003

(86) PCT No.: PCT/EP03/04500

§ 371 (c)(1),
(2), (4) Date: Nov. 18, 2004

(87) PCT Pub. No.: WO03/092982

PCT Pub. Date: Nov. 13, 2003

(65) Prior Publication Data

US 2005/0175830 A1 Aug. 11, 2005

(30) Foreign Application Priority Data

May 4, 2002 (DE) ................ 102 20 038

(51) Int. Cl.
*B32B 3/26* (2006.01)
*B32B 5/16* (2006.01)

(52) U.S. Cl. ............. 428/402; 428/304.4; 428/308.4; 428/315.5; 428/315.7

(58) Field of Classification Search .......... 428/402, 428/305.5, 308.4, 314.2, 304.4, 315.5, 315.7; 521/52, 79

See application file for complete search history.

(56) References Cited

U.S. PATENT DOCUMENTS 4,247,498 A 1/1981 Castro (Continued)

FOREIGN PATENT DOCUMENTS

| DE | 27 37 745 | 3/1978 |
|---|---|---|
| DE | 32 05 289 | 8/1983 |
| DE | 44 37 860 | 4/1996 |
| EP | 0 133 882 | 3/1985 |
| EP | 0 297 744 | 1/1989 |
| GB | 2 178 447 | 2/1987 |

(Continued)

*Primary Examiner*—H. T Le
(74) *Attorney, Agent, or Firm*—Oliff & Berridge, PLC (57) ABSTRACT

Method for producing foamed microporous polymer molded bodies by melting a thermoplastic polymer in a first zone of an extrusion device, mixing in a highly volatile blowing agent, conveying the polymer melt containing the blowing agent into a second zone in which dissolution of the blowing agent occurs to saturation of the polymer melt at the foaming temperature, and molding and foaming of the loaded polymer melt to a foamed structure, whereby, in the second zone, a pressure above 90 bar, a blowing agent concentration above the critical minimum concentration for complete foaming, and the foaming temperature, lying above the solidification temperature of the polymer melt saturated with blowing agent, are set such that the polymer molded body obtained has a porosity in the range between 40 and 90 vol. % and an open-cell pore structure with uniform cross-sectional distribution. Foamed microporous polymer molded bodies in the form of particles comprising a thermoplastic polymer with uniform open-cell pore structure, a porosity of 40 to 90 vol. %, an accessible proportion of pore volume of at least 0.75 and an average cell size between 1 and 100 μm.

7 Claims, 5 Drawing Sheets

U.S. PATENT DOCUMENTS

| | | |
|---|---|---|
| 4,594,207 A | 6/1986 | Josefiak et al. |
| 4,666,607 A | 5/1987 | Josefiak et al. |
| 4,919,992 A | 4/1990 | Blundell et al. |
| 5,160,674 A | 11/1992 | Colton et al. |
| 6,383,424 B1 | 5/2002 | Huang et al. |
| 6,808,375 B2 | 10/2004 | Klotzer |
| 6,960,616 B2 * | 11/2005 | Klotzer .................. 521/52 |
| 2007/0042183 A1 * | 2/2007 | Stenzel et al. ............ 428/402.2 |

FOREIGN PATENT DOCUMENTS

| | | |
|---|---|---|
| WO | WO 98/55540 | 12/1998 |
| WO | WO 99/38604 | 8/1999 |
| WO | WO 00/26006 | 5/2000 |

* cited by examiner

METHOD FOR PRODUCING FOAMED POLYMER MOLDED BODIES AND SAID FOAMED POLYMER MOLDER BODIES

This is a U.S. national stage application of International Application No. PCT/EP03/04500 filed Apr. 30, 2003. The entire disclosure of the prior application is hereby incorporated by reference herein in its entirety.

BACKGROUND OF THE INVENTION

1. Field of Invention

The invention relates to a method for producing a foamed open-cell microporous polymer molded body comprising at least one thermoplastic polymer, and microporous foamed polymer molded bodies in the form of polymer particles of open-cell pore structure comprising at least one thermoplastic polymer.

2. Description of Related Art

Microporous polymer molded bodies find a variety of applications, in which they are used in a number of different forms. A wide area of application of microporous polymer molded bodies in particle form is the masterbatch technique, in which open-cell porous polymer particles are loaded with liquid additives or even solid additives that are soluble in liquids. Examples of such additives are flame retardants, antioxidants, antistatics and plasticizers. The loaded polymer particles are then mixed in the application as, for example, an additive masterbatch to a base polymer, by which means a homogeneous distribution of the additives in the base polymer can be achieved even at very low concentration. A further application involves porous polymer particles loaded with active substances, whereby active substances such as fragrances or pharmaceutical active ingredients such as drugs are introduced into the porous structure of the particles and released into the environment slowly and in a controlled manner in the application. The loading capacity of the porous polymer particles plays an important role in these applications. For example, loading with additive or active ingredient of up to 70 wt. % relative to the total weight of polymer and additive or active ingredient is sometimes required. Among the prerequisites for this is a high porosity of the polymer particles. The polymer particles must also possess sufficient stability, i.e., a compressibility that is as low as possible, otherwise, on storage of the particles loaded with additives or active substances in, for example, containers or sacks, the additives or active substances may be released from the particles.

Finally, porous polymer particles can also be used, on account of their large internal surface area, to absorb liquids, as for example in the separation of oils from water.

Microporous polymer molded bodies in the form of hollow-fiber membranes or flat membranes find varied application in the filtration of fluids, particularly in the area of ultrafiltration and microfiltration. In this case it is attempted to obtain high porosities, in the absence of which the attainable throughput through the membranes is too low. On the other hand the maximum porosity that can be set is often limited by the requirement that membranes used in processing and application have a certain minimum strength.

Various methods are known for production of microporous polymer molded bodies. DE 27 37 745 C2, for example, describes a method for producing microporous polymer molded bodies, based on a process involving thermally induced phase separation. In this method a homogeneous solution of a polymer component in a suitable solvent system is first produced at elevated temperatures. The polymer components and the solvent system form a binary system that in the liquid state of aggregation has a region where it is present as a homogeneous solution, and another region in which it possesses a miscibility gap. Cooling of such a system below the demixing temperature results in phase separation and finally in the formation of a porous polymer structure. Methods of this type for membrane production are described also in, for example, DE-A-32 05 289 and EP-A-0 133 882.

Another method for producing porous polymer particles is described in WO 98/55540, in which a polyolefin polymer is dissolved in a solvent and the solution dispersed, at a temperature above the crystallization temperature of the polyolefin, in a non-solvent for the polyolefin, with the formation of a multiphase system. Porous polyolefin particles are obtained on cooling of the dispersion.

These known methods allow production of polymer molded bodies of high porosity and open-pored structure as well as high loading capacity. However, the above methods for their production have the disadvantage that the required use of solvents necessitates costly extraction and/or drying processes for removal of these solvents. Despite this costly extraction and/or drying, complete removal of the solvent from the polymer molded bodies obtained is usually not achieved, resulting in restrictions on the use of such polymer molded bodies in the areas of, e.g., medicine or food technology, or even in the electrical industry.

Another method proposed for the production of porous polymer molded bodies involves releasing the pressure on a pressurized melt consisting of a thermoplastic polymer containing a volatile blowing agent. U.S. Pat. No. 5,160,674, for example, describes a method for producing foamed materials from semicrystalline polymers, in which a pressurized melt of the polymer used is saturated with a gas and shaped, also under pressure; the reduction of pressure after removal from the die then causes foaming of the polymer material. Foamed materials produced by the method of U.S. Pat. No. 5,160,674 show a homogeneous porous structure, wherein the pores or cells are however closed. Closed-cell materials of this type cannot be loaded with additives or active substances, however, and are also unsuitable as membranes because they allow no throughput, or at best very low throughput, of the fluid to be filtered.

DE-A 44 37 860 describes a method for production of sheet-like microcellular foams from amorphous thermoplastic polymers such as polystyrene, whereby a thermoplastic polymer melt is impregnated with a volatile blowing agent in a first extrusion zone and the melt containing the blowing agent is then cooled in a second extrusion zone by at least 40° C. to a temperature lying at least 30° C. above the glass transition temperature of the polymer containing the blowing agent. On releasing the pressure on the melt to normal pressure and cooling it to room temperature, the melt expands and solidifies to a foam sheet.

WO 00/26006 describes a method for producing microcellular foams from polymers or polymer mixtures for forming of molded bodies such as hollow-fiber or flat membranes. In a first extrusion zone a polymer melt is loaded with a compressed gas under the action of a shearing and/or kneading means, and in a second extrusion zone the solubility of the gas in the gas-loaded melt, and therefore foaming, are improved by increasing the pressure. The foamed molded bodies obtained as a consequence of pressure release after extrusion through a die may have either an open-cell or closed-cell structure depending on the setting of the process conditions, the mean cell size, according to the disclosed example, lying in the range of approx. 10 μm. The foams obtained by the method described in WO 00/26006 have high porosity in a range higher than 90 vol. %. In many applications, however, foamed structures of this type cannot be used on account of their poor mechanical stability.

WO 99/38604 discloses foamed porous membranes made from thermoplastic polymers and a method for their production. The membranes described in WO 99/38604 have a mean pore diameter of between 0.05 and 30 µm, a porosity of at least 75 vol. % and a proportion of open cells of at least 80%. They are produced by a method in which a polymer melt comprising at least one polymer is conveyed through an extrusion device under pressure and loaded with a cell former in an injection stage. The pressure in this part of the extrusion device is set to at least 150 bar and the temperature, which is above the glass transition or melting temperature, is so chosen that correct and smooth functioning of the extrusion device is guaranteed. In a downstream mixing step, a single-phase melt is produced from the at least one polymer and the cell former, the temperature of the melt in the mixing step being reduced below the working temperature in the previous part of the extrusion device and/or the pressure raised. The single-phase melt is extruded through a die for shaping of the membrane, during which the cell former foams the polymer melt as a consequence of the resulting fall in pressure. To attain the desired proportion of open cells, the cell formers consist according to WO 99/38604 of at least two components, which are gases and/or low-boiling liquids that must have different speeds of diffusion relative to the polymer melt. The high proportion of open cells is ascribed, according to WO 99/38604, to the opening of cells that were initially closed, apparently because the blowing agent with the lower diffusion speed gives rise to a high internal cell pressure resulting in rupture of the cell walls, which are very thin on account of the high porosity also required. It is clear from this that the method of WO 99/38604 can be used at best to only a limited extent for production of foamed structures of low porosity. Limitations are also placed on the applicability of the method by the requirement that the cell former must consist of at least two components of different diffusion speeds relative to the polymer melt.

SUMMARY OF THE INVENTION

It is therefore an object of the present invention to provide a method by means of which microporous polymer molded bodies in the form of, for example, particles or membranes can be produced economically without the need for costly extraction procedures, whereby the polymer molded bodies should have a uniform pore structure, low compressibility and a high proportion of open cells.

It is a further object of the present invention to provide microporous polymer molded bodies in the form of particles that are suitable for loading with additives or active substances and should possess uniform pore structure, low compressibility and a high proportion of open cells.

These and other objects are achieved on the one hand by a method for producing foamed microporous polymer molded bodies comprising at least one thermoplastic polymer, comprising the steps:
  a. melting of the at least one thermoplastic polymer at a first temperature in a first zone of an extrusion device and introduction of a highly volatile blowing agent, at a pressure higher than that of the polymer melt so produced, into the first zone of the extrusion device,
  b. loading of the polymer melt in the first zone of the extrusion device with the blowing agent, and mixing of the blowing agent into the polymer melt under the action of a shearing and/or kneading means on the polymer melt, whereby at least partial dissolution of the blowing agent in the polymer melt occurs simultaneously,
  c. conveying of the polymer melt loaded with blowing agent, by means of a conveyor system coupled to a pressure regulating device, through a second zone of the extrusion device connected to the first zone and into a die positioned at the end of the second zone, whereby the temperature in the second zone is set to a second temperature, defined as the foaming temperature, which is equal to or lower than the first temperature, whereby dissolution of the blowing agent to saturation of the polymer melt occurs in the second zone,
  d. molding of the polymer melt in the die and subsequent foaming of the molded polymer melt loaded with blowing agent on exit from the die of the polymer melt, to give a foamed structure on account of the blowing agent contained in the polymer melt,
  e. cooling of the foamed structure until it solidifies, whereby the polymer melt loaded with blowing agent produced in the second zone of the extrusion device has a solidification temperature, the method being characterized in that the pressure in the second zone of the extrusion device is set above a minimum pressure $p_{min}$ of 90 bar, that the blowing agent concentration is set at least equal to the critical minimum concentration for complete foaming, and that the foaming temperature is set to a value above the solidification temperature such that the porous polymer molded body obtained has a porosity in the range between 40 and 90 vol. % and an open-cell pore structure with uniform cross-sectional distribution.

While state of the art methods lead to satisfactory results in the main only for very high porosities, the method of the invention allows porosities to be set selectively over the entire range of 40 to 90 vol. % while retaining the combination of the features according to the invention. The method of the invention thus produces polymer molded bodies with a high proportion of open cells and at the same time great mechanical stability. The foaming temperature for production of the polymer molded bodies required by the invention is preferably set to a maximum of 30% higher than the solidification temperature, and especially preferably to 10 to 30% higher than the solidification temperature.

Objects of the invention are also achieved by a method for production of foamed microporous polymer molded bodies comprising at least one thermoplastic polymer, comprising the steps:
  a. melting of the at least one thermoplastic polymer at a first temperature in a first zone of an extrusion device and introduction of a highly volatile blowing agent, at a pressure higher than that of the polymer melt so obtained, into the first zone of the extrusion device,
  b. loading of the polymer melt in the first zone of the extrusion device with the blowing agent, and mixing of the blowing agent into the polymer melt under the action of a shearing and/or kneading means on the polymer melt, whereby at least partial dissolution of the blowing agent in the polymer melt occurs simultaneously,
  c. conveying of the polymer melt loaded with blowing agent, by means of a conveyor system coupled to a pressure regulating device, through a second zone of the extrusion device connected to the first zone and into a die positioned at the end of the second zone, whereby the temperature in the second zone is set to a second temperature, defined as the foaming temperature, which is equal to or lower than the first temperature, whereby dissolution of the blowing agent to saturation of the polymer melt occurs in the second zone, d. molding of the polymer melt in the die and subsequent foaming of the molded polymer melt, on exit from the die of the polymer melt loaded with blowing agent, to give a foamed structure on account of the blowing agent contained in the polymer melt, e. cooling of the foamed structure until it solidifies, whereby the polymer melt loaded with blowing agent produced in the second zone of the extrusion device has a solidification temperature, the method being characterized in that the pressure in the second zone of the extrusion device is set above a minimum pressure $p_{min}$ of 90 bar, that the blowing agent concentration is set at least equal to the critical minimum concentration for complete foaming, and that the foaming temperature is set to a value that is 10 to 30% above the solidification temperature.

It was found that this method allows production of porous polymer molded bodies with a porosity in the range of 40 to 90 vol. % and an open-cell pore structure with uniform cross-sectional distribution.

DETAILED DESCRIPTION OF PREFERRED EMBODIMENTS

The methods of the invention preferably can be used for production of polymer molded bodies with porosity in the range of 40 to 85 vol. %. The methods of the invention are particularly suitable for production of polymer molded bodies with porosity in the range of 50 to 80 vol. %. The foaming temperature is therefore preferably set at a value 10 to 20% higher than the solidification temperature. The foaming temperature is especially preferably set so that porous polymer molded bodies of porosity between 60 and 75 vol. % are obtained. Furthermore, the methods of the invention do not require extraction, which is usually costly, of the molded bodies obtained in order to remove residual solvents, for example, so that the methods of the invention allow comparatively economical production of microporous polymer molded bodies.

It has been found in connection with the invention that on plotting the solidification temperature of the polymer melt, or of the polymer melt loaded with blowing agent, vs. the blowing agent concentration in the polymer melt, two concentration regions can be distinguished. The solidification temperature of the polymer melt enriched or loaded with blowing agent is defined here as the lowest temperature at which correct functioning of the extrusion device in its second zone and in the die is guaranteed. Below the solidification temperature, the melt begins to solidify and cannot exit from the die. Incipient die blockage can be detected by an exponential increase of pressure in the second zone of the extrusion device. Once blockage has occurred, it cannot be removed by increasing the pressure but only by a considerable increase in temperature in the second part of the extrusion device. The solidification temperature depends on the type of polymer used and its molar mass or melt index as well as on the concentration of blowing agent dissolved in the melt.

As the blowing agent concentration increases, the solidification temperature in a first concentration region at first decreases monotonically and essentially linearly; in a second concentration region, at higher concentrations of blowing agent, it then becomes constant and independent of blowing agent concentration. The intersection of the best fit straight lines for these two regions represents a critical blowing agent concentration. It is observed that for blowing agent concentrations below this critical concentration, the resulting polymer molded bodies have inhomogeneous distribution of cells with some non-porous regions and macropores or cavities, as well as unsatisfactory porosity. In a concentration region above the critical blowing agent concentration, on the other hand, complete foaming of the polymer molded bodies can be achieved. In the context of the present invention, complete foaming is understood to be foaming in which the polymer molded body has a porosity of at least 95 vol. % and also homogeneous distribution of the pores or cells. A homogeneous pore distribution is one in which the pore structure is uniform with no macropores or cavities, and in which the diameter of the largest pores differs from the mean pore diameter by a factor of 10 at most. The critical blowing agent concentration therefore corresponds to the critical minimum concentration for complete foaming.

It was now found that in the method of embodiments of the invention, the blowing agent concentration, i.e., the concentration, relative to the melt comprising the at least one polymer, of the blowing agent introduced into the first zone of the extrusion device, must be set to a value at least equal to the critical minimum concentration for complete foaming. This also ensures that the proportion of open cells required by the invention in the polymer molded body is attained. On the other hand, it is not practical to set the blowing agent concentration at too high a value. At blowing agent concentrations that are significantly too high, it is no longer possible to dissolve the entire quantity of blowing agent in the melt. In such cases, fairly large quantities of undissolved blowing agent can escape from the die; in addition, large zones of undissolved blowing agent in the melt could lead to formation of macropores. The blowing agent concentration should therefore preferably exceed the critical blowing agent concentration, i.e., the minimum concentration for complete foaming, by a maximum of 5 wt. % and especially preferably by a maximum of 3 wt. %.

In the method of embodiments of the invention, a melt of the at least one thermoplastic polymer introduced into the extrusion device is first produced in the first zone of the extrusion device, and this melt is conveyed through the extrusion device under pressure. The introduction of the highly volatile blowing agent into the polymer melt occurs preferably under a pressure higher than that in the first zone of the extrusion device, and advantageously at a temperature higher than the glass transition or melt temperature of the at least one polymer in the first zone of the extrusion device. The blowing agent can be introduced for example in an injection step, e.g., through a sintered metal, to achieve good distribution of the blowing agent in the polymer melt. The blowing agent is preferably introduced at a pressure greater than 150 bar. Loading of the polymer melt with the blowing agent introduced and mixing of the blowing agent into the polymer melt occur under the action of a shearing or kneading means on the polymer melt. The temperature in this area of the extrusion device is preferably so chosen that, immediately after introduction of the blowing agent, further treatment of the polymer melt loaded with blowing agent occurs while maintaining the temperature of the melt of the at least one polymer in its pure form, or at temperatures lower than this. By this means alone, part of the blowing agent dissolves in the polymer melt.

The highly volatile blowing agent used in the context of the method of the invention should be at least largely inert towards the at least one polymer used. The highly volatile blowing agent can be a low-boiling liquid or a gas. It is also possible to use mixtures of various low-boiling liquids, mixtures of various gases, and even mixtures of, for example, a low-boiling liquid and a gas, as described for example in WO 99/38604. Examples of the low-boiling liquids that can be used are water, pentane, and even low-boiling alcohols. Suitable gases include ethane, propane, butane, nitrogen and carbon dioxide. Carbon dioxide is used in preference.

The method of embodiments of the invention can be used for amorphous and semicrystalline thermoplastic polymers. Suitable polymers include particularly polyolefins, polyesters, sulfone polymers such as polysulfone or polyethersulfones, polyamides and polycarbonates, as well as modifications, blends, mixtures and copolymers of these polymers. Polyolefins such as polyethylene, polypropylene, polybutylene and poly(4-methyl-1-pentene) are preferably used, and polypropylene especially preferably used.

The polymer melt loaded with blowing agent is conveyed into the second zone of the extrusion device by a conveyor system in the form of, for example, a gear pump or a second extruder, coupled to a pressure regulating device. This second zone of the extrusion device is preferably designed as an additional mixing stage. In a preferred embodiment, the second zone is a tubular extruder head that can be heated and also cooled if necessary, which in an especially preferred embodiment is provided with mixing elements, for example in the form of static mixers. In the second zone of the extrusion device, saturation of the polymer melt with the blowing agent should occur and the blowing agent should be dissolved as completely as possible in the polymer melt. It is therefore advantageous for the polymer melt that has been loaded with blowing agent to be mixed in the second zone by mixing elements, which are preferably in the form of static mixers. The foamed polymer molded bodies obtained in this way show a high degree of homogeneity. At the end of the second zone, a further pressure regulating device such as another melt gear pump can be interposed before the die, to allow the pressure in the second zone of the extrusion device to be set with flexibility.

The division of the extrusion line into a first zone and a second zone that is decoupled from the first allows the temperature and pressure in each zone to be set as required by the current process and independently of the temperature and pressure in the other zone. It is therefore possible to reduce the temperature in the second zone, i.e., the foaming temperature, relative to that in the first zone, and/or to increase the pressure in the second zone relative to that in the first zone. This is advantageous because lower temperatures and higher pressures allow a higher blowing agent concentration to be introduced into the melt without undissolved blowing agent remaining in the melt. Reduction of the temperature of the melt loaded with blowing agent and/or increase of pressure in the second zone of the extrusion device allows more blowing agent to be introduced into the polymer melt in the first zone than can be dissolved under the conditions prevailing in the first zone, because the excess is brought into solution subsequently, during treatment in the second zone of the extrusion device. The effect can be exploited here of the lowering of the softening or melting temperature of the polymer melt loaded with blowing agent, or of the reduction in viscosity of the melt at a given temperature, as the blowing agent content increases. It is therefore possible to reduce the processing or foaming temperature in the second zone of the extrusion device relative to the temperature in the first zone without any increase in viscosity. In accordance with one aspect of the invention, however, the foaming temperature must be set to a value that is 10 to 30%, and preferably 10 to 20%, higher than the solidification temperature of the polymer melt loaded with blowing agent in the second zone.

The pressure in the second zone of the extrusion device is preferably higher than that in the first zone. According to embodiments of the invention, the pressure in the second zone must be at least 90 bar, and is preferably set to values greater than 120 bar and especially preferably to values greater than 200 bar. This also allows stable process control.

After passing through the second zone of the extrusion device, the polymer melt loaded with blowing agent is molded in a die connected to the second zone, and on leaving the die is foamed to give the foamed structure as a result of the reduction in pressure, typically to normal pressure. It is advantageous if the temperature of the die can be set independently of that in the second zone of the extrusion device. The die is preferably conditioned to a die temperature that is independent of the foaming temperature and lies above it. The die temperature is especially preferably up to 20% higher than the foaming temperature. The porosity can thus be influenced in the direction of a reduction in porosity as compared with a polymer molded body in the production of which the foaming temperature and die temperature are the same.

Foamed structures and therefore polymer molded bodies can be produced in various forms, depending on the die used. In preferred embodiments, foamed polymer molded bodies in the form of a solid fiber, hollow fiber or flat sheet are produced by the method of the invention. Foamed polymer molded bodies in the form of a hollow fiber or flat sheet are especially preferably hollow-fiber membranes or flat membranes. When a hollow fiber or hollow-fiber membrane is being produced, the polymer melt loaded with blowing agent is extruded through a die in the form of a hollow-fiber die with a central capillary, whereby for example a gas acting as a lumen filler is metered through the interior bore of the capillary to form and stabilize the cavity of the hollow fiber being produced.

In another preferred embodiment of the method of the invention, the foamed structure is broken up in an additional process step to give polymer molded bodies in the form of foamed polymer particles. The cooled foamed structure is preferably granulated by, for example, a cutting disk, granulator, blade or fly cutter to give polymer molded bodies in the form of foamed polymer particles. For the breaking up, the previously stabilized foamed structure is preferably further cooled by, for example, ice water, liquid nitrogen or dry ice to guarantee a high proportion of open cells at the interfaces.

The method of the invention is therefore excellently suited for production of microporous polymer particles for use as, for example, an additive masterbatch or for loading with active substances, the polymer particles having low compressibility and high loading capacity. Because no solvent is used in the method of the invention, this method allows the production of microporous polymer particles that are especially suitable also for use for in medical applications.

The invention therefore relates also to foamed microporous polymer molded bodies in particle form, i.e., foamed microporous polymer particles made from at least one thermoplastic polymer with open-cell pore structure distributed uniformly over the particle cross-section, a porosity in the range of 40 to 90 vol. %, and an accessible proportion of pore volume of at least 0.75, the cells forming the open-cell pore structure having a mean size of between 1 and 100 µm.

The foamed microporous polymer particles are especially suitable for loading with additives or active substances.

The accessible proportion of the pore volume, or pore accessibility, which is important with respect to loadability, is understood here to be the proportion of the pore volume provided by the porosity that is accessible to an additive or an active substance and can therefore be loaded with an additive or an active substance. The accessible proportion of the pore volume is therefore also a measure of the proportion of open cells of the structure of the polymer molded body of the invention or produced by the method of the invention. The accessible proportion of the pore volume is preferably at least 0.85.

For the use of the polymer particles of the invention, it is important from the economic viewpoint that, apart from the general accessibility of the pores, additives or active substances can be taken up by the polymer particles within a sufficiently short time. Polymer particles of the invention preferably have a characteristic loading time of <90 min and especially preferably of <45 min. The particles can therefore be loaded with additives or active substances in a sufficiently short time. In the context of the present invention, the characteristic loading time is understood as the time required by the polymer molded body to absorb the quantity of additive necessary for loading of 90% of the accessible pore volume. The accessible proportion of the pore volume as currently determined for the polymer particle in question is used for this purpose. A silane of type Silcat XL70, commercially available from the Organo Silicones Group of Witco Surfactants GmbH, Germany, is used in the present invention as additive for determination of pore accessibility and characteristic loading time.

Microporous polymer particles having a porosity in the range 40 to 85 vol. % are preferred, and those with a porosity between 50 and 80 vol. % are especially preferred. Microporous polymer particles with a porosity between 60 and 75 vol. % have especially well-balanced properties. Also preferred are microporous polymer particles having a mean cell size between 5 and 50 µm.

The structure of the polymer particles of the invention, or of the polymer molded bodies produced by the method of the invention, is distinguished by a three-dimensional network of cells or honeycombs separated from one another by thin walls, the cells or honeycombs being connected with one another via holes or perforations or by permeable network structures in the walls. Permeable network structures of this type that connect cells or honeycombs are characteristic of the present polymer molded bodies or polymer particles, and are presumably due to bursting of thin wall structures during foaming of the polymer melt that still possesses plastic deformability.

The general criteria for assessing whether polymer particles are suitable for loading with active substances or for use as an additive masterbatch are primarily the porosity and the proportion of open cells of the polymer particles. Adequately high porosity of the polymer particles is a prerequisite for the uses mentioned above. At the same time, the proportion of open cells of the pore structure must be high, the crucial factors here being not only the existence of connections between the cells constituting the foamed structure but also adequate permeability of these connections to the additive or active substance with which the polymer particles are to be loaded. A high loading capacity of the particles is also an important assessment criterion. It is furthermore important, for economy of processing, that the foamed polymer particles be capable of being loaded with additive or active substance within a relatively short time. Finally, adequate stability, i.e., a compressibility that is the minimum possible, is an important criterion from the viewpoint of storage of the loaded polymer particles. The requirements are excellently met by the polymer particles of the invention or produced by the method of the invention.

In a further preferred embodiment, the polymer particles of the invention have a mean particle size in the range of 1 to 5 mm.

Good results are obtained for the loading capacity of the polymer particles of the invention when the particle cells on the external surface are accessible. It is therefore advantageous if the polymer particles of the invention have a surface porosity, averaged over all external surfaces, of at least 25%.

On account of their well balanced structure, e.g., their defined porosity in the range between 40 and 90 vol. % and a mean cell size of less than 100 µm and preferably less than 50 µm, the foamed polymer particles of the invention have high stability, i.e. low compressibility. In use, therefore, polymer particles of the invention loaded with additive or active substance can safely be stored without danger of release of the additive or active substance from the pore structure as a result of compression of the particles.

The polymers from which the polymer particles of the invention are made can be the same as those used in the method of the invention for production of the polymer particles of the invention. The polymer particles of the invention preferably comprise at least one polyolefin and especially preferably a polypropylene.

The invention will now be explained in detail with the help of the figures and examples of embodiments.

Figure 1:
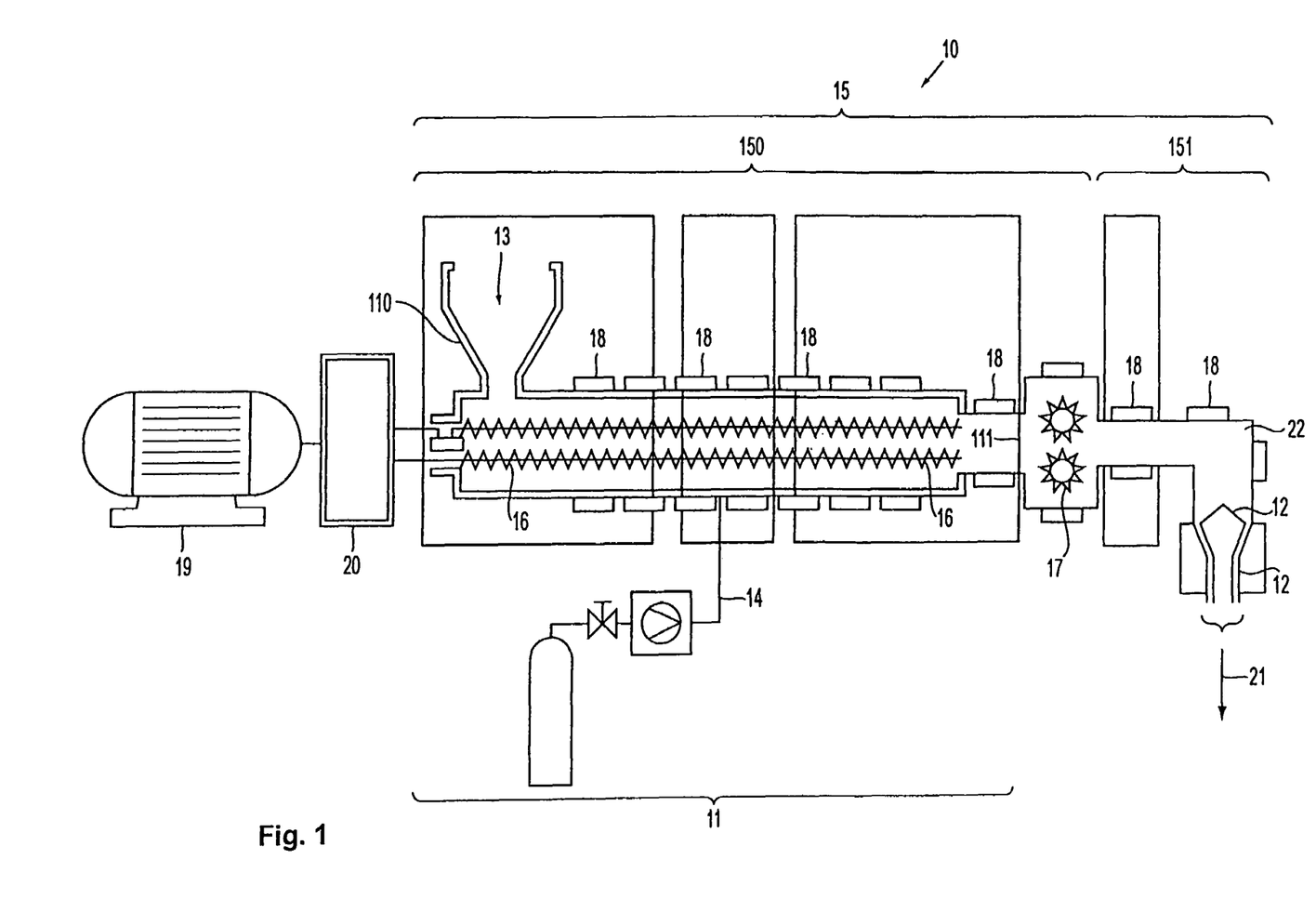
FIG. 1: Cross-section of an apparatus suitable for carrying out the method of the invention, in a simplified schematic representation.

FIG. 1 is a schematic representation of an apparatus suitable for carrying out the method of embodiments of the invention. The apparatus 10 shown comprises essentially an extruder 11, forming the first zone 150 of the extrusion device, with a long extruder body. Shearing/kneading/homogenizing devices 16 of the type, for example, of a helical conveyor that is known per se, are mounted in a way that is known per se in this extruder 11. The extruder has a funnel-shaped inlet 110 through which the at least one polymer 13, typically in the form of a granulate or powder, is fed into the extruder 11 and then conveyed as a melt to an outlet 111 located opposite the inlet 110 by means of the shearing/kneading/homogenizing devices 16. The apparatus has for this purpose a drive motor 19 and if required a gear mechanism 20, by which the shearing/kneading/homogenizing devices 16 are rotatably coupled to the drive motor 19.

Mounted all around the long cylinder of the extruder 11 are temperature-control devices 18, which can be cooling devices or heating devices. In the central section of the extruder 11, the blowing agent used for foaming is injected through a dosing system and supply line 14 into the interior of the extruder. A conveyor system 17, for example in the form of a melt gear pump, coupled to a pressure regulating device is situated directly next to the outlet 111 and therefore forms the end of the first zone of the extrusion device.

Adjacent to the conveyor system 17 is the second zone 151 of the extrusion device, which in the present embodiment is in the form of, for example, a tubular extruder head 22 with a right-angle bend. The second zone is also equipped with temperature-control devices 18, by means of which the temperature of the gas-enriched polymer melt located in the interior of the extruder head can be appropriately regulated. The extruder head 22 preferably contains mixing devices, which are not shown in the diagram, static mixing elements being excellently suited for the purpose. At the end of the extruder head 22 as viewed in the direction of extrusion is a die 12, by means of which the polymer melt loaded with blowing agent is molded. On exit from this die, the polymer melt loaded with blowing agent is foamed to give a porous molded body. The exit of the molded body from the apparatus 10 is symbolized by the arrow 21.

The method of embodiments of the invention is carried out as follows with the use of the apparatus 10 described above.

The at least one polymer 13, preferably in the form of a granulate, is fed through the funnel-shaped inlet 110 into the extruder 11 that forms the first zone 150 of the extrusion device, whereby the at least one polymer is first melted by means of the temperature-control devices 18. The melting and finally melted polymer is conveyed by means of the shearing/kneading/homogenizing devices 16, which are driven by drive motor 19, to the region of the extruder 11 into which the blowing agent is injected under high pressure via the dosing system and supply line 14 into the interior of the extruder 11. The quantity of blowing agent is so adjusted that the concentration of blowing agent in the polymer melt lies above the minimum concentration for complete foaming.

The rotation of the shearing/kneading/homogenizing devices 16 prevents the blowing agent from being deposited on the surface of the melt of the at least one polymer. It also effects mixing of the blowing agent into the polymer melt, whereby the blowing agent dissolves at least partially in the polymer melt. In the part of the extruder 11 downstream of the inlet feed for the blowing agent, the temperature of the melt enriched with blowing agent can be lowered relative to the original melt temperature and then held essentially constant up to outlet 111 by means of the temperature-control devices 18, to increase the solubility of the blowing agent in the polymer melt.

The polymer melt loaded with blowing agent is conveyed to the second zone 151 of the extrusion device by means of the melt gear pump 17. In this second zone, which in the present invention is in the form of a tubular extruder head 22, the temperature of the polymer melt loaded with blowing agent is reduced to the foaming temperature by means of the temperature-control devices 18 mounted there, the foaming temperature depending on the desired porosity of the porous polymer molded body obtained, and being preferably up to 30% higher than the solidification temperature of the polymer melt loaded with blowing agent. The pressure in the second zone 151 may simultaneously be increased if required, the minimum pressure being 90 bar in every case. These conditions further increase the solubility of the blowing agent in the polymer melt.

The polymer melt loaded with blowing agent is molded in the die 12 and, on leaving die 12, foams to a foamed structure on account of the reduction in pressure. The foamed structure is then cooled in an appropriate manner to obtain the porous polymer molded body of the invention with an open-cell structure and a porosity that can be set in the range 40 to 90 vol. %.

In the examples below, the following methods were used for characterization of the porous polymer molded bodies obtained.

Determination of Particle Size

The average particle size can be determined microscopically with the help of a representative quantity of the sample, using a measuring eyepiece or an appropriate image analysis method.

Determination of Mean Cell Size

The mean cell size or pore size is determined with the help of digitalized SEM micrographs of fracture patterns of the samples which are analyzed with the help of suitable image analysis software. A SEM micrograph allows measurement in µm of the pore diameter or cell diameter of approx. 50 to 100 cells or pores. The mean cell size or mean pore diameter is then calculated from the individual values by averaging.

Determination of Volume Porosity

The volume porosity is determined pycnometrically. Approx. 1 to 5 g of the test material is weighed-in dry, the test material having previously been broken up if required by means of a blade, for example, and with cooling. To prevent floating of the test material during the subsequent measurement on account of the low density of the porous particles, the test material is introduced into the pycnometer in a suitable cage, a 100 ml pycnometer with thermometer and side capillary being used. The pycnometer is then filled with a suitable measurement liquid that does not wet the test material; water (18 MOhm-water) can generally be used for this purpose. The actual volume of the pycnometer is determined in advance, by use of the same measurement liquid that is subsequently used. The measurement is carried out at 20° C. The porosity $\epsilon$ of the test material can be determined from the initial weight of test material, the density of the polymer constituting the test material, the density of the measurement liquid used and the difference in mass of the measurement liquid in the pycnometer with and without the test material.

Determination of the Accessible Proportion of the Pore Volume, or Pore Accessibility Determination of the accessible proportion of the pore volume or pore accessibility requires that the volume porosity of the test material be known.

Approx. 10 to 30 g of the test material are weighed into a 500 ml glass flask. If the test material consists of polymer molded bodies in the form of strands or films, these are first broken up into particles of dimensions in the range of approx. 1 to 5 mm. Care must be taken that open cut faces are obtained during this breaking up, which is conveniently carried out by means of sharp tools such as razor blades, microtome blades or granulators and, if required, with cooling. If the test material is already in particle form, it can be used directly.

The accessible proportion of the pore volume is determined by measuring the loading capacity by means of an additive, the additive used being a silane of type Silcat XL70 (from Witco Surfactants GmbH, Organo Silicones Group). The quantity, i.e., volume, of the silane that is to be added to the test material is determined by the porosity of the test material or by the pore volume of the test material initially weighed-in, the pore volume of the test material being determined from the initial weight, the polymer density $\rho_{polymer}$ and the porosity $\epsilon$. In the first step, silane is metered in a quantity that can be expected to be completely absorbed by the test material. The volume of the silane added corresponds to approx. 60% of the pore volume determined for the sample.

After the addition, the glass flask is attached to a suitable mixing device such as a rotary evaporator with a water bath maintained at a temperature of 25° C. Mixing is continued until the test material is dry from the outside and flows freely. The loading time from the start of mixing to complete absorption of the additive is determined with a stopwatch.

The glass flask is then detached from the mixing device and a further quantity of silane, corresponding to 5% of the pore volume, is added. Mixing is then performed again, and the time required for this quantity of silane to be completely absorbed by the sample is recorded. This process is repeated until the test material is saturated with the additive, the quantity of silane metered in each time corresponding to 5% of the pore volume. Saturation is defined here as the state in which even after a total loading time of 3 hours, a film of the silane remains on the wall of the glass flask and/or agglutination of the particles of the test material is observed. The total loading time is defined here as the sum of the individual loading times as determined with the stopwatch. The saturated test material is then reweighed and the total quantity of silane absorbed by the test material is determined by subtracting the initial weight from the current weight.

The accessible proportion of the pore volume or pore accessibility $\alpha$ can then be found by substituting the density $\rho_{silane}$ of the Silcat XL-Pearl 70 silane used ($\rho_{silane}=0.91$ g/cm$^3$) in the equation:

$$\alpha = \frac{V_{silane}}{V_{pore\ volume}} = \frac{m_{silane}/\rho_{silane}}{\frac{\varepsilon}{100-\varepsilon} \cdot (m_{test}/\rho_{polymer})}$$

where $\alpha$=pore accessibility or accessible proportion of pore volume, $V_{silane}$=volume in cm$^3$ of the silane added until saturation of the test material occurs, $V_{pore\ volume}$=pore volume in cm$^3$ of the weighed-in test material, $m_{silane}$=mass in g of silane added until saturation of the test material occurs, $m_{test}$=initial weight in g of the test material, $\rho_{silane}$=density in g/cm$^3$ of the silane used, $\rho_{polymer}$=density in g/cm$^3$ of the polymer constituting the test material, $\varepsilon$=porosity (as a percentage) of the test material Determination of the Characteristic Loading Time The determination of the characteristic loading time assumes that the porosity $\varepsilon$ and the accessible pore volume a of the test material are known.

To determine the characteristic loading time, a quantity of test material between approx. 10 and 30 g is weighed into a 500 ml glass flask. The sample is prepared as described above.

The characteristic loading time is determined for the quantity of additive necessary for loading of 90% of the accessible pore volume of the test material. The silane Silcat XL-Pearl 70 is again used as the additive. The quantity of silane $m_{90\%}$ to be added to the weighed-in test material can be determined from the equation:

$$m_{90\%}[g] = 0.9 \cdot \alpha \cdot \rho_{silane} \cdot \frac{\varepsilon}{100-\varepsilon} \cdot (m_{test}/\rho_{polymer})$$

After addition of the silane, the glass flask is attached to a suitable mixing device such as a rotary evaporator with a water bath maintained at a temperature of 25° C. Mixing is continued until the test material is dry from the outside and flows freely. The period of time from the start of mixing to complete absorption of the additive is measured with a stopwatch and represents the characteristic loading time of the test material.

Determination of Surface Porosity

The surface porosity is determined by means of scanning electron micrographs (SEM). SEM micrographs of approx. 100-fold magnification are obtained of representative sections of the particle surface of size 0.8 mm×0.6 mm, and the images are analyzed. The SEM micrographs are digitalized and the area of the dark regions on the micrograph, which correspond to the pores or cells and stand out from the lighter regions ascribed to the cell walls, are determined with the help of a computer. The surface porosity is then calculated as the ratio of the pore area to the total surface area.

Determination of Compressibility

The measurement is performed for solid fibers or hollow fibers by means of a commercially available semi-automatic thickness tester that is suitable for testing in accordance with DIN 53855 Part 1, such as a device of type 16304 from Karl Frank GmbH. In this device a piston with a variable loading weight can be lowered on to, and raised from, the sample under measurement by a geared motor. The displacement is measured by means of a digital displacement sensor.

A piston of area 10 cm$^2$ and diameter 35.68 mm is used for the measurement. A straight piece of the test material is fixed on the base plate in such a way that the piston can press down radially on the cylindrical surface of the test material with its entire diameter, along a line of length 35.68 mm. The test sample is subjected to various loads at room temperature and the distance between the lower edge of the piston and the base plate is measured in every case after a load time of 10 sec. Contact forces or loads of, e.g., 0.5, 1.25, 2.5, 5.5, 12.5, 20, 25 and 50N, are applied in an ascending sequence.

The quotient of the measured distances, i.e., of the respective thicknesses of the test material in the compressed state to the original sample thickness in the uncompressed state, is plotted on a semilogarithmic scale against the applied force. The measured distance for a load of 0.5N is taken as the original sample thickness. From the quotient Q for a load of 10N, the percentage compressibility of the test material is determined as $(1-Q)\cdot 100$.

EXAMPLE 1

To determine the critical minimum concentration for complete foaming, the polypropylenes Stamylan 11E10 (from DSM; melt index=0.3 g/10 min at 230° C./21.6N) and Moplen VS 6100K (from Montell; melt index=25 g/10 min at 230° C./21.6N) were fed into an extrusion device of the type shown in FIG. 1 and melted in the extruder. A melt temperature of 250° C. was set for Stamylan 11E10 and of 185° C. for Moplen VS 6100K. Supercritical $CO_2$ was injected as blowing agent into the molten polypropylene melt in a concentration between 0 and 13 wt. % and at a pressure in the range of 160 to 210 bar. Following the injection, the $CO_2$ was mixed into the polymer melt by the kneading and shearing action of the extruder screw, and partially dissolved in the melt.

The respective polypropylene melt loaded with $CO_2$ was conveyed by means of a melt gear pump to the second zone of the extrusion device, in the form of an angled tubular extruder head, and then removed from the extrusion device via a nozzle with circular outlet attached to the end of the second zone. The gas-loaded polymer melt foamed in the process to a foam fiber. By means of temperature-control elements mounted on the extruder head, the temperature of the gas-loaded melt was in each case reduced stepwise to the solidification temperature, i.e., the temperature below which solidification of the $CO_2$-loaded polypropylene melt occurs and the melt no longer emerges from the nozzle.

Figure 2:
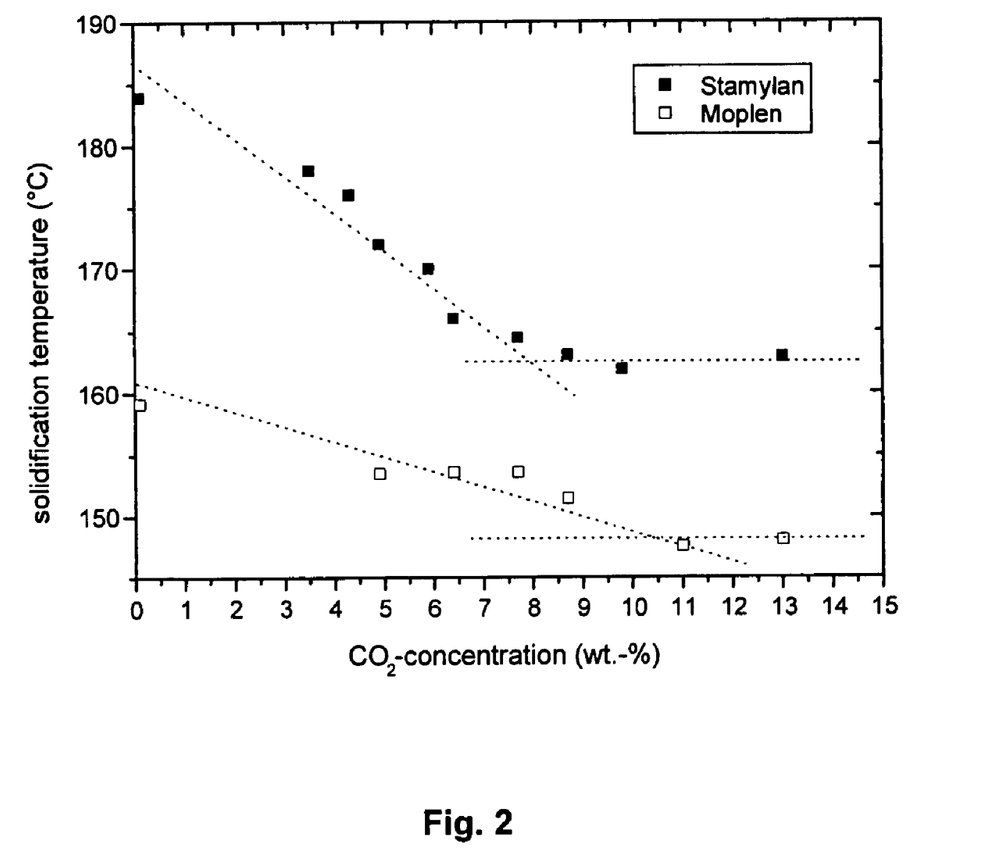
FIG. 2: Dependence of the solidification temperature on $CO_2$ concentration for the polypropylenes Stamylan 11E10 and Moplen VS6100K.

The solidification temperatures for the two types of polypropylene investigated are plotted in FIG. 2 as a function of blowing agent concentration in wt. %, i.e., the quantity of $CO_2$ metered into the extruder per time unit, relative to the amount of polymer solution transported in the time unit (and therefore relative to the total quantity of polymer and blowing agent).

Figures 3, 4:
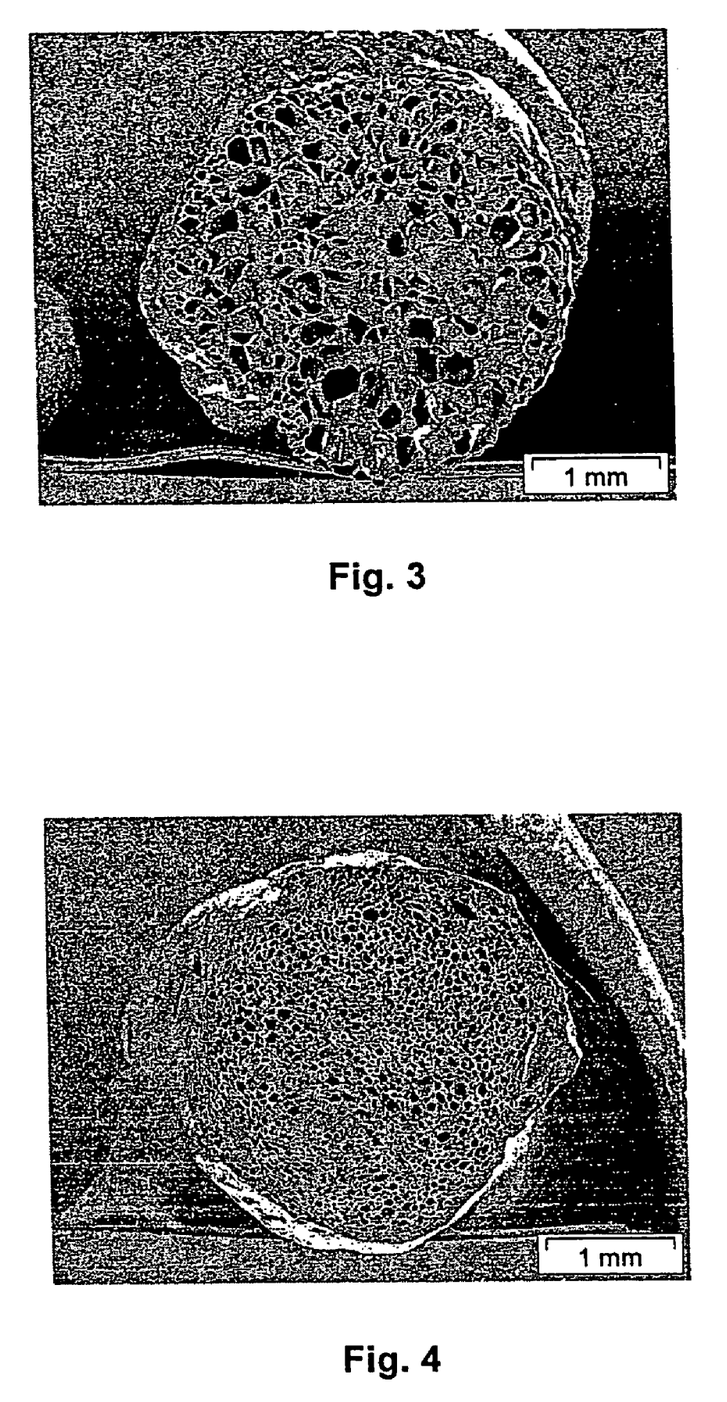
FIG. 3: Polymer molded body corresponding to Example 1 with inadequate foaming on account of the blowing agent concentration being too low.
FIG. 4 Polymer molded body corresponding to Example 1 with completely foamed structure.

For both the polymers, in a first concentration range, the solidification temperature initially decreases relative to the solidification temperature of the pure polymer as the $CO_2$ concentration increases, and then, in a second concentration range, remains constant as the $CO_2$ concentration is further increased. The regression lines drawn through the points in each region intersect at approx. 7.7 wt. % for Stamylan 11E10 and at approx. 10.5 wt. % for Moplen VS 6100K. The $CO_2$ concentrations associated with these points of intersection represent the critical minimum concentrations for complete foaming for the Stamylan 11E10/$CO_2$ and Moplen VS 6100K/$CO_2$ systems. At $CO_2$ concentrations below the critical minimum concentration for complete foaming, fully foamed structures are not obtained (FIG. 3). It is only above the critical minimum concentration that complete foaming is attained, with a porosity above 95 vol. % and homogeneous pore structure (FIG. 4).

EXAMPLE 2

Polypropylene of the type Stamylan 11E10 (from DSM) was processed in an extrusion device as in Example 1. The polymer was melted at a temperature of 250° C. Supercritical $CO_2$ was injected as blowing agent into the melted polymer at a concentration of 7.7 wt. % and a pressure of 179 bar. After passing through the second zone, the $CO_2$-loaded polypropylene melt was extruded through a nozzle of diameter 0.8 mm. The temperature in the second zone, i.e., the foaming temperature, was set to 188° C., which is approx. 15% higher than the solidification temperature of 163° C. The pressure in the second zone was higher than 97 bar.

Figure 5:
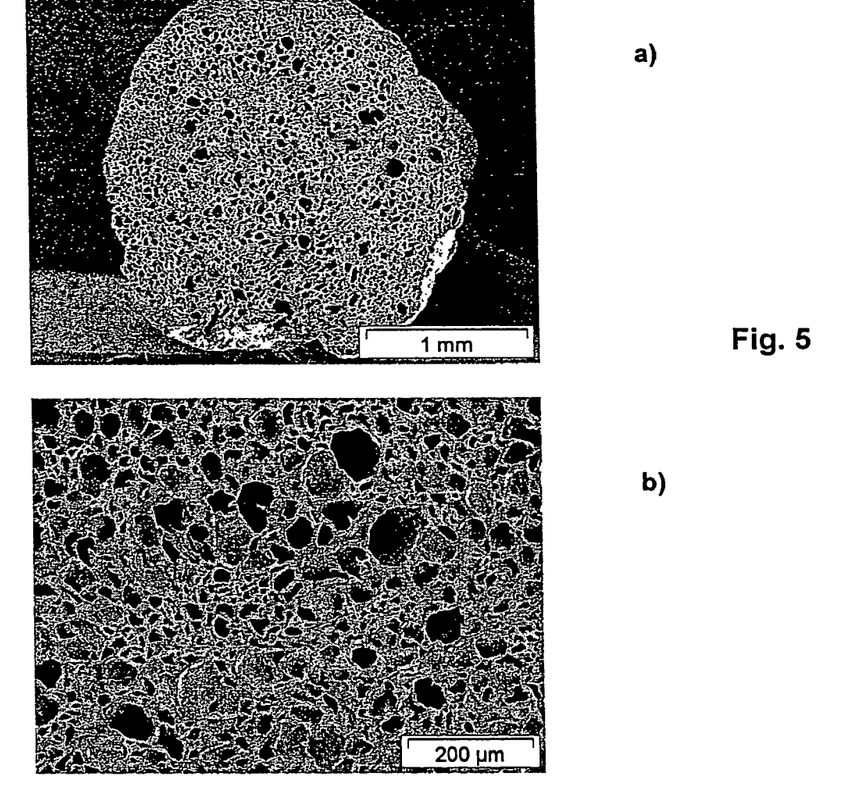
FIG. 5: Polymer molded body of the invention corresponding to Example 2, with a porosity of 74 vol. %.

On leaving the nozzle, the extruded melt foamed to a porous solid fiber with microporous, open-cell structure and a diameter of 2.25 mm. The porosity was determined as 74 vol. %. The foamed solid fiber had a mean cell size of approx. 34 μm (FIGS. 5*a,b*). The compressibility of this solid fiber under a load of 10N was 15%.

In the use of this type of product as, for example, an additive concentrate, a maximum compressibility of 25% under a load of 10N is regarded as adequate to guarantee sufficient storage stability.

EXAMPLE 3

The porous Stamylan 11E10 solid fiber of Example 2 was broken up, with cooling, by means of a granulator to give cylinder-shaped particles of length approx. 2.25 mm and a diameter corresponding to that of the solid fiber. For a total porosity of 74 vol. %, the porous polymer particles so produced had a pore accessibility a of 0.87 and a characteristic loading time of 35 min. Their surface porosity was approx. 29%.

EXAMPLE 4

Polypropylene of type Moplen VS 6100K (from Montell) was processed in an extrusion device as in Example 1. The polymer was melted at a temperature of 185° C. Supercritical $CO_2$ was injected as blowing agent into the melted polymer at a concentration of 10.5 wt. % and a pressure of 210 bar. After passing through the second zone, the $CO_2$-loaded polypropylene melt was extruded through a nozzle of diameter 0.8 mm. The temperature in the second zone was set to 164° C., which is approx. 11% higher than the solidification temperature of 148° C. The pressure in the second zone was approx. 112 bar.

Figure 6:
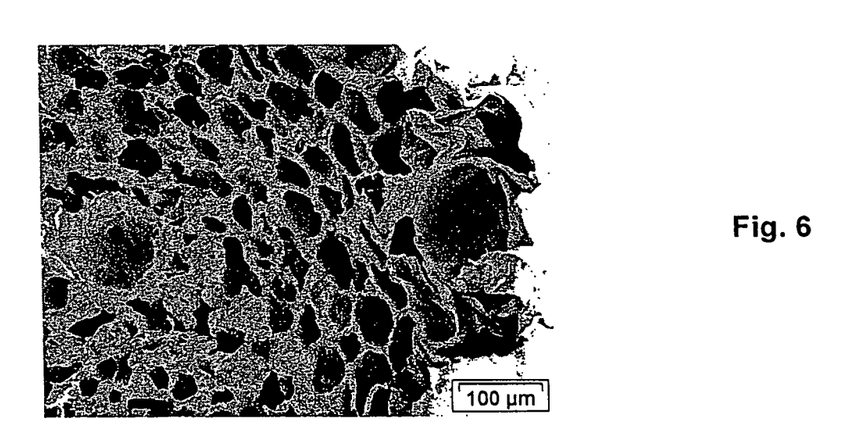
FIG. 6: Polymer molded body of the invention corresponding to Example 4, with a porosity of 73 vol. %.

On leaving the nozzle, the extruded melt foamed to a porous solid fiber with a microporous, open-cell structure and a diameter of 1.15 mm. The porosity was determined as 73 vol. %. The foamed solid fiber had a mean cell size of approx. 44 μm (FIG. 6). The compressibility of this solid fiber under a load of 10N was 18%.

EXAMPLE 5

The porous Moplen VS 6100K 6100 solid fiber of Example 4 was broken up, with cooling, by a granulator to give cylinder-shaped particles of length approx. 1.5 mm and a diameter corresponding to that of the solid fiber. For a total porosity of 73 vol. %, the porous polymer particles so produced had a pore accessibility α of 0.85 and a characteristic loading time of 20 min. Their surface porosity was approx. 27%.

COMPARATIVE EXAMPLE 1

Analogously to Example 2, polypropylene of type Stamylan 11E10 was processed in an extrusion device as described for Example 1. Supercritical $CO_2$ in a concentration of approx. 8 wt. % was injected into the melted polymer. The temperature in the second zone was, however, set to 172° C., which is approx. 5.5% higher than the solidification temperature of 163° C.

Figure 7:
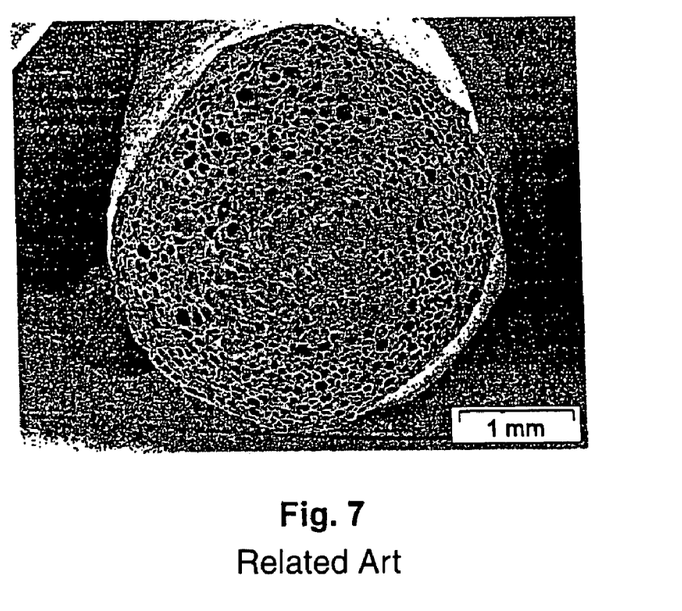
FIG. 7: Polymer molded body corresponding to Comparative Example 1 with complete foaming.

The foamed solid fiber so obtained had a porosity of 96 vol. %, which corresponded to the porosity for complete foaming and lay outside the range required by the invention (FIG. 7). The set foaming temperature of 172° C. was therefore not sufficiently high. This fully foamed solid fiber, and therefore also the porous polypropylene particles produced from it, had a compressibility under a load of 10N of 39%, which is clearly too high.

COMPARATIVE EXAMPLE 2

Again analogously to Example 2, polypropylene of type Stamylan 11E10 was processed in an extrusion device as described for Example 1. Supercritical $CO_2$ was injected as blowing agent into the melted polymer, but in a concentration of only 4.3 wt. %. The temperature in the second zone was set to 179° C., which is slightly above the solidification temperature determined for this concentration.

Figure 8:
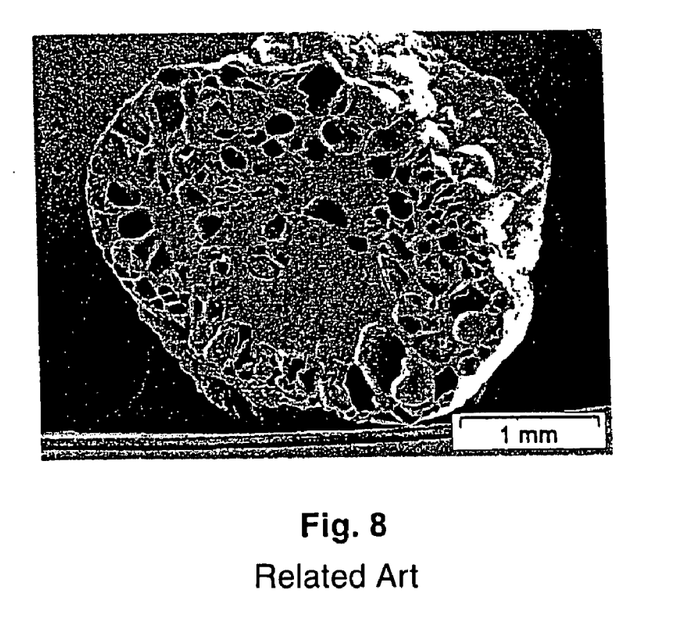
FIG. 8: Polymer molded body corresponding to Comparative Example 2 with a porosity of 72 vol. %.

The foamed solid fiber thus obtained, while having a porosity of 72 vol. %, showed in cross-section a marked inhomogeneity in pore structure with large non-porous areas (FIG. 8).

The invention claimed is:

1. A foamed microporous polymer molded body in particle form comprising at least one thermoplastic polymer with an open-cell pore structure of uniform cross-sectional distribution, a porosity of 40 to 90 vol. % and an accessible proportion of pore volume of at least 0.75, wherein the open-cell pore structure is a three-dimensional network of cells separated from one another by thin walls and wherein the cells constituting the open-cell pore structure have a mean cell size of between 1 and 100 μm.

2. Foamed microporous polymer particles according to claim 1 with a porosity between 50 and 80 vol. %.

3. Foamed microporous polymer particles according to claim 1, wherein the at least one thermoplastic polymer is at least one polyolefin.

4. Foamed microporous polymer particles according to claim 3, wherein the at least one polyolefin is polypropylene.

5. Foamed microporous polymer particles according to claim 1, wherein the particles have a mean particle size of 1 to 5 mm.

6. Foamed microporous polymer particles according to claim 1, wherein the particles have a surface porosity of at least 25%.

7. Foamed microporous polymer particles according to claim 1, wherein the particles have a characteristic loading time of <90 min.

* * * * *

UNITED STATES PATENT AND TRADEMARK OFFICE
CERTIFICATE OF CORRECTION

PATENT NO. : 7,429,420 B2
APPLICATION NO. : 10/513402
DATED : September 30, 2008
INVENTOR(S) : Frank Wiese et al.

It is certified that error appears in the above-identified patent and that said Letters Patent is hereby corrected as shown below:

On the title page at (54) and at column 1, lines 1-3, the title "METHOD FOR PRODUCING FOAMED POLYMER MOLDED BODIES AND SAID FOAMED POLYMER MOLDER BODIES" should be --FOAMED POLYMER MOLDED BODIES HAVING THREE-DIMENSIONAL PORE STRUCTURE--.

Signed and Sealed this

Twenty-fifth Day of November, 2008

JON W. DUDAS
*Director of the United States Patent and Trademark Office*